(12) United States Patent
Boles et al.

(10) Patent No.: US 12,166,655 B2
(45) Date of Patent: Dec. 10, 2024

(54) SYSTEM AND METHOD FOR INJECTING LATENCY FOR ENTERPRISE SYSTEMS

(71) Applicant: JPMorgan Chase Bank, N.A., New York, NY (US)

(72) Inventors: Ryan Boles, Ostrander, OH (US); Rohan Chauhan, Christchurch (GB); Scott Blakley, Allen, TX (US); Sharon Zakashefski, Middlesex, NJ (US); Paul Austin, Lewis Center, OH (US); Tony Lotito, Freehold, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 341 days.

(21) Appl. No.: 17/651,361

(22) Filed: Feb. 16, 2022

(65) Prior Publication Data

US 2023/0261959 A1    Aug. 17, 2023

(51) Int. Cl.
*H04L 43/0888* (2022.01)
*H04L 41/14* (2022.01)

(52) U.S. Cl.
CPC ........ *H04L 43/0888* (2013.01); *H04L 41/145* (2013.01)

(58) Field of Classification Search
None
See application file for complete search history.

(56) References Cited

U.S. PATENT DOCUMENTS

2010/0138567 A1*  6/2010  Haggar ................... H04L 69/32
                                                  710/29
2014/0153591 A1*  6/2014  Bedrosian ............. H04J 3/0658
                                                  370/517

* cited by examiner

*Primary Examiner* — Saad Khawar
(74) *Attorney, Agent, or Firm* — GREENBLUM & BERNSTEIN, P.L.C.

(57) ABSTRACT

A method for providing varying amounts of simulated latencies for a mainframe is disclosed. The method includes modifying routing to pass through a simulated latency injector system; setting an initial latency amount for the target mainframe; when the mainframe application is determined to be unstable, modifying the OSA routing to bypass the simulated latency injector system; when the mainframe application is determined to be stable in the first monitoring, initiating a planned latency injection schedule for injecting latencies in differing amounts until a target latency amount is reached; performing monitoring for the stability of the mainframe application; modifying an injected latency amount back to the initial latency amount when the mainframe application is determined to be unstable in the monitoring; and applying another latency amount specified in the planned latency injection schedule when the mainframe application is determined to be stable.

20 Claims, 6 Drawing Sheets

SYSTEM AND METHOD FOR INJECTING LATENCY FOR ENTERPRISE SYSTEMS

TECHNICAL FIELD

This disclosure generally relates to a system and method for simulating an impact of increased latency on mainframes and nonstop platforms by injecting artificial latency for simulating latency at a region to which a hosting platform is to be located.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Presently, when hosting platforms are moved to a different region, latency may be introduced in response to the move to the new region or location. However, changes in latency may impact performance of other mainframes and nonstop platforms, which may cause lengthy downtimes and technical inefficiencies to be incurred until the impacts to the other mainframes and nonstop platforms are remediated or resolved.

SUMMARY

According to an aspect of the present disclosure, a method for providing varying amounts of simulated latencies for a mainframe is provided. The method includes performing, using a processor and a memory: modifying an open system adapter (OSA) routing to pass through a simulated latency injector system to inject a simulated latency for a target mainframe; setting an initial latency amount for the target mainframe; performing first monitoring for stability of a mainframe application; when the mainframe application is determined to be unstable in the first monitoring, modifying the OSA routing to bypass the simulated latency injector system; when the mainframe application is determined to be stable in the first monitoring, initiating a planned latency injection schedule for injecting latencies in differing amounts until a target latency amount is reached; performing second monitoring for the stability of the mainframe application for a predetermined period of time after injection of at least one latency among the latencies; modifying an injected latency amount back to the initial latency amount when the mainframe application is determined to be unstable in the second monitoring; and applying another latency amount specified in the planned latency injection schedule when the mainframe application is determined to be stable in the second monitoring.

According to another aspect of the present disclosure, the latencies in differing amounts is injected for the target mainframe in an increasing manner until the target latency is reached, and the second monitoring is performed after each injection.

According to another aspect of the present disclosure, the planned latency injection schedule for the target mainframe is determined to be complete when the at least one latency injected has the target latency amount and the mainframe application is determined to be stable for the predetermined period of time in the second monitoring.

According to yet another aspect of the present disclosure, the latencies in differing amounts included in the planned latency injection schedule is injected in a production environment.

According to another aspect of the present disclosure, the method further includes performing a third monitoring for the stability of the mainframe application for a predetermined period of time after the modifying of the injected latency amount back to the initial latency amount; and when the mainframe application is determined to be unstable in the third monitoring, modifying the OSA routing to bypass the simulated latency injector system.

According to a further aspect of the present disclosure, the method further includes performing a third monitoring for the stability of the mainframe application for a predetermined period of time after the modifying of the injected latency amount back to the initial latency amount; when the mainframe application is determined to be stable in the third monitoring, remediating an issue causing the mainframe application instability; and resuming latency injection according to the planned latency injection schedule.

According to yet another aspect of the present disclosure, the latency injection is resumed by injecting a latency injection amount that caused the instability of the mainframe application detected in the third monitoring, and continuing with remainder of the planned latency injection schedule.

According to a further aspect of the present disclosure, the latency injection is resumed by restarting latency injections from beginning of the planned latency injection schedule.

According to another aspect of the present disclosure, the modifying of the OSA routing is performed dynamically in a production environment.

According to a further aspect of the present disclosure, each of the injecting of the latencies is separated by a predetermined period of time.

According to a further aspect of the present disclosure, the planned latency injection schedule injects the latencies in differing amounts in a sequential order until the target latency amount is reached, and the second monitoring is performed after each injection.

According to a further aspect of the present disclosure, the injecting of the latencies in differing amounts is performed dynamically.

According to a further aspect of the present disclosure, the method further includes determining a source of network traffic being directed through the simulated latency injector system; comparing the determined source with a filter list for determining whether to inject or not inject the latencies in differing amounts; and excluding injection of the latencies in differing amounts for the network traffic from the determined source when the determined source is included in the filter list.

According to a further aspect of the present disclosure, the determined source of the network traffic is determined based on an IP address of the network traffic.

According to another aspect of the present disclosure, an application having a collocation affinity to the target mainframe is included in the filter list.

According to another aspect of the present disclosure, the OSA routing and latency injection amounts are dynamically controlled for reducing impact to at least one of a downstream service or application, and an external service or application in a production environment.

According to another aspect of the present disclosure, the latencies in differing amounts is injected to the mainframe application via an API.

According to another aspect of the present disclosure, the initial latency amount is 0 ms.

According to another aspect of the present disclosure, a system for providing varying amounts of simulated latencies for a mainframe is disclosed. The system includes at least one processor; at least one memory; and at least one communication circuit. The at least one processor is configured to perform: modifying an open system adapter (OSA) routing to pass through a simulated latency injector system to inject a simulated latency for a target mainframe; setting an initial latency amount for the target mainframe; performing first monitoring for stability of a mainframe application; when the mainframe application is determined to be unstable in the first monitoring, modifying the OSA routing to bypass the simulated latency injector system; when the mainframe application is determined to be stable in the first monitoring, initiating a planned latency injection schedule for injecting latencies in differing amounts until a target latency amount is reached; performing second monitoring for the stability of the mainframe application for a predetermined period of time after injection of at least one latency among the latencies; modifying an injected latency amount back to the initial latency amount when the mainframe application is determined to be unstable in the second monitoring; and applying another latency amount specified in the planned latency injection schedule when the mainframe application is determined to be stable in the second monitoring.

According to another aspect of the present disclosure, a non-transitory computer readable storage medium that stores a computer program for providing varying amounts of simulated latencies for a mainframe is disclosed. The computer program, when executed by a processor, causing a system to perform a process including modifying an open system adapter (OSA) routing to pass through a simulated latency injector system to inject a simulated latency for a target mainframe; setting an initial latency amount for the target mainframe; performing first monitoring for stability of a mainframe application; when the mainframe application is determined to be unstable in the first monitoring, modifying the OSA routing to bypass the simulated latency injector system; when the mainframe application is determined to be stable in the first monitoring, initiating a planned latency injection schedule for injecting latencies in differing amounts until a target latency amount is reached; performing second monitoring for the stability of the mainframe application for a predetermined period of time after injection of at least one latency among the latencies; modifying an injected latency amount back to the initial latency amount when the mainframe application is determined to be unstable in the second monitoring; and applying another latency amount specified in the planned latency injection schedule when the mainframe application is determined to be stable in the second monitoring.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
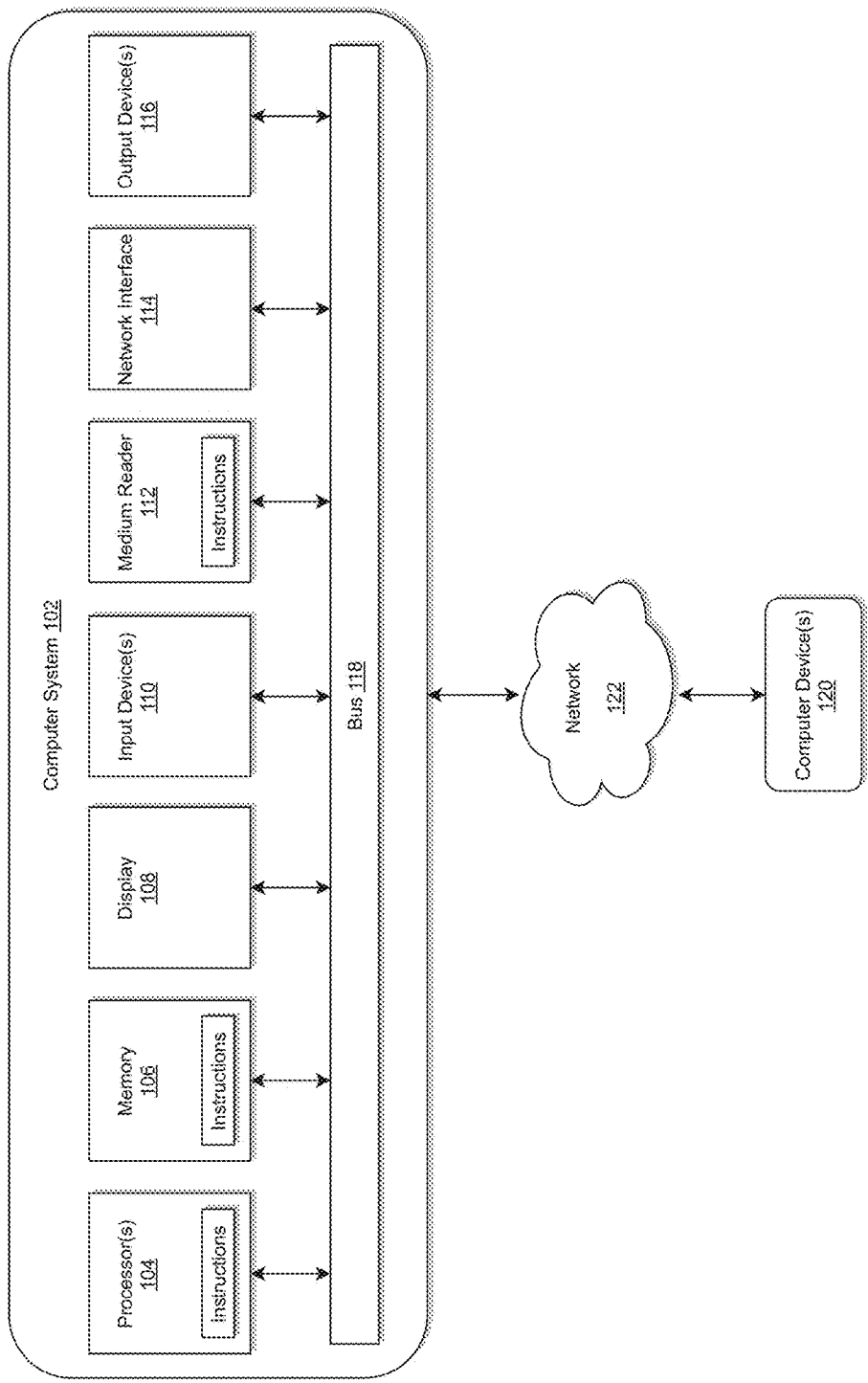
FIG. 1 illustrates a computer system for implementing a simulated latency injection system in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing a simulated latency injection system in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
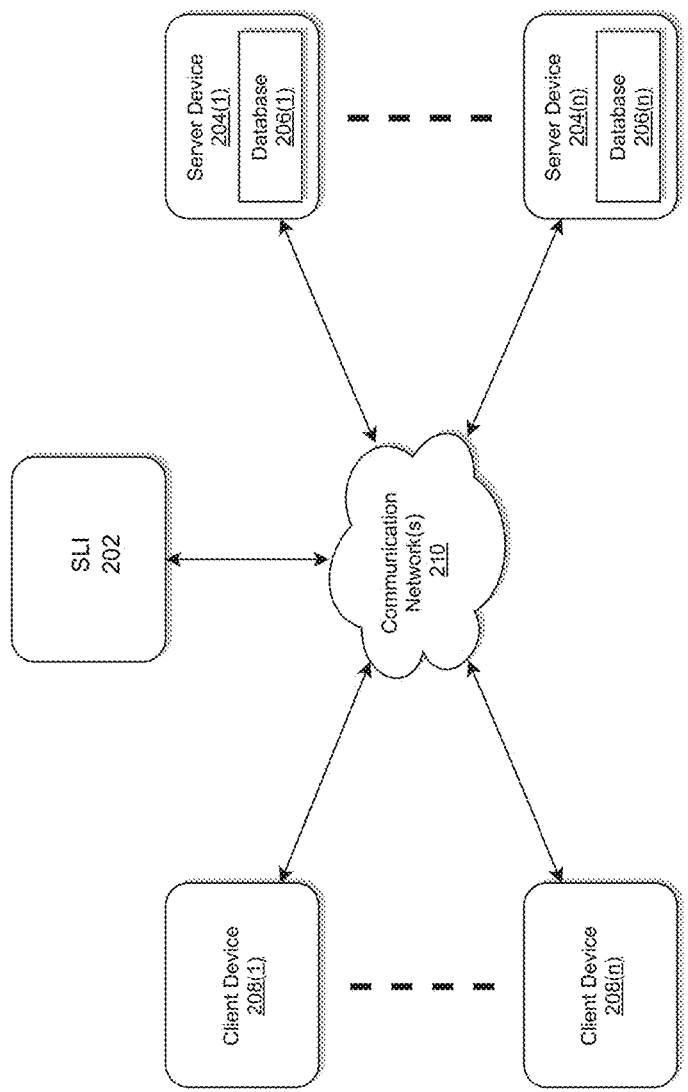
FIG. 2 illustrates an exemplary diagram of a network environment with a simulated latency injection system in accordance with an exemplary embodiment.

FIG. 2 illustrates an exemplary diagram of a network environment with a simulated latency injection system in accordance with an exemplary embodiment.

A simulated latency injection (SLI) system 202 may be the same or similar to the computer system 102 as described with respect to FIG. 1.

The SLI system 202 may store one or more applications that can include executable instructions that, when executed by the SLI system 202, cause the SLI system 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the SLI system 202 itself, may be located in virtual server(s) running in a cloud-based computing environment rather than being tied to one or more specific physical network computing devices. Also, the application(s) may be running in one or more virtual machines (VMs) executing on the SLI system 202. Additionally, in one or more embodiments of this technology, virtual machine(s) running on the SLI system 202 may be managed or supervised by a hypervisor.

In the network environment 200 of FIG. 2, the SLI system 202 is coupled to a plurality of server devices 204(1)-204(n) that hosts a plurality of databases 206(1)-206(n), and also to a plurality of client devices 208(1)-208(n) via communication network(s) 210. A communication interface of the SLI system 202, such as the network interface 114 of the computer system 102 of FIG. 1, operatively couples and communicates between the SLI system 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SLI system 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SLI system 202 may be a standalone device or integrated with one or more other devices or apparatuses, such as one or more of the server devices 204(1)-204(n), for example. In one particular example, the SLI system 202 may be hosted by one of the server devices 204(1)-204(n), and other arrangements are also possible. Moreover, one or more of the devices of the SLI system 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SLI system 202 via the communication network(s) 210 according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the SLI system 202 that may efficiently provide a platform for implementing a cloud native SLI module, but the disclosure is not limited thereto.

The client devices 208(1)-208(n) may run interface applications, such as standard web browsers or standalone client applications, which may provide an interface to communicate with the SLI system 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the SLI system 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SLI system 202, the server devices 204(1)-204(n), or the client devices 208(1)-208(n), for example, may be configured to operate as virtual instances on the same physical machine. For example, one or more of the SLI system 202, the server devices 204(1)-204(n), or the client devices 208(1)-208(n) may operate on the same physical device rather than as separate devices communicating through communication network(s) 210. Additionally, there may be more or fewer SLI systems 202, server devices 204(1)-204(n), or client devices 208(1)-208(n) than illustrated in FIG. 2. According to exemplary embodiments, the SLI system 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
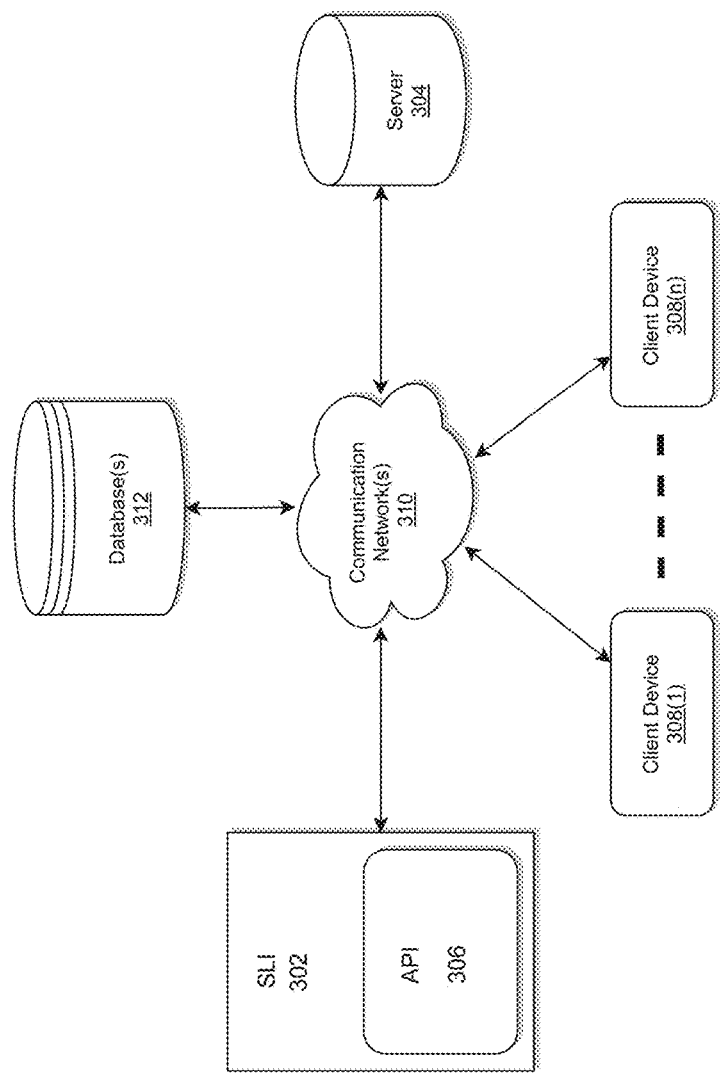
FIG. 3 illustrates a system diagram for implementing a simulated latency injection system in accordance with an exemplary embodiment.

FIG. 3 illustrates a system diagram for implementing a simulated latency injection system in accordance with an exemplary embodiment.

As illustrated in FIG. 3, the system 300 may include a site reliability engineering leaderboard system 302 within which a group of API modules 306 is embedded, a server 304, a database(s) 312, a plurality of client devices 308(1) . . . 308(n), and a communication network 310.

According to exemplary embodiments, the SLI system 302 including the API modules 306 may be connected to the server 304, and the database(s) 312 via the communication network 310. Although there is only one database has been illustrated, the disclosure is not limited thereto. Any number of databases may be utilized. The SLI System 302 may also be connected to the plurality of client devices 308(1) . . . 308(n) via the communication network 310, but the disclosure is not limited thereto.

According to exemplary embodiment, the SLI system 302 is described and shown in FIG. 3 as including the API modules 306, although it may include other rules, policies, modules, databases, or applications, for example. According to exemplary embodiments, the database(s) 312 may be embedded within the SLI system 302. According to exemplary embodiments, the database(s) 312 may be configured to store configuration details data corresponding to a desired data to be fetched from one or more data sources, user information data etc., but the disclosure is not limited thereto.

According to exemplary embodiments, the API modules 306 may be configured to receive real-time feed of data or data at predetermined intervals from the plurality of client devices 308(1) . . . 308(n) via the communication network 310.

The API modules 306 may be configured to implement a user interface (UI) platform that is configured to enable SLI as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the SLI system 302. In this regard, the plurality of client devices 308(1) . . . 308(n) may be "clients" of the SLI system 302 and are described herein as such. Nevertheless, it is to be known and understood that the plurality of client devices 308(1) . . . 308(n) need not necessarily be "clients" of the SLI system 302, or any entity described in association therewith herein. Any additional or alternative relationship may exist between either or both of the plurality of client devices 308(1) . . . 308(n) and the SLI system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the SLI system 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The SLI system 302 may be the same or similar to the SLI system 202 as described with respect to FIG. 2, including any features or combination of features described with respect thereto.

Figure 4:
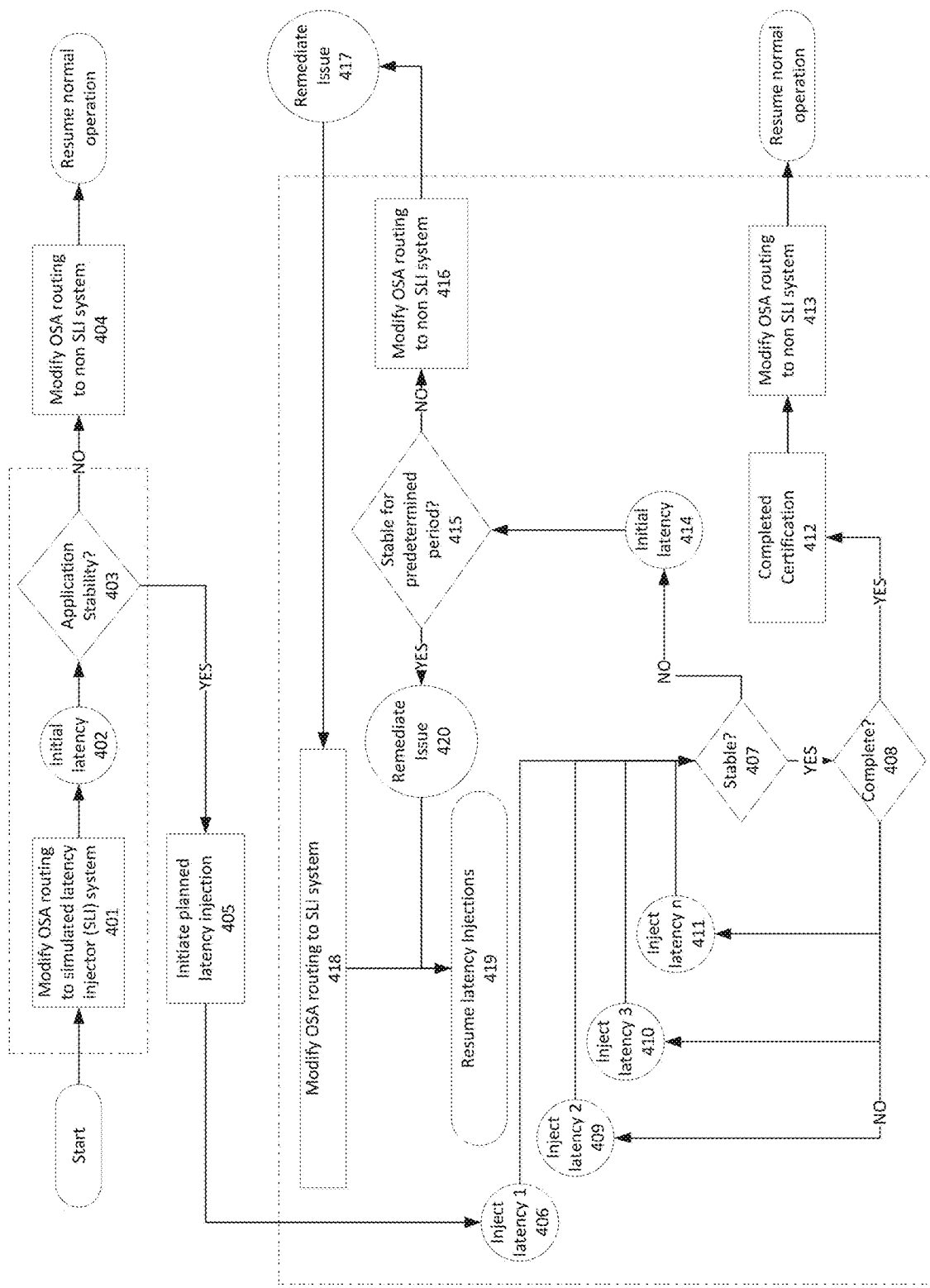
FIG. 4 illustrates a system flow for injecting simulated latency in accordance with an exemplary embodiment.

FIG. 4 illustrates a system flow for injecting simulated latency in accordance with an exemplary embodiment.

Prior to moving a mainframe to another location or geographic region, a user acceptance testing may be performed with simulated latency injections for the mainframe to be moved. In an example, the latency may be injected through an API. However, although latency may be injected to a network path of the mainframe, the effects of injected latency may not be determined properly for various external services/applications or downstream/upstream applications/services to which the user acceptance testing may not reach as access to such applications or services may be unavailable. Further, a limited simulated latency injection provided in user acceptance testing may not account for applications or devices that may be required to move with the mainframe, and thus leading to inaccurate results. Accordingly, by using such user acceptance testing, only an estimated performance and issues may be calculated prior to the physical moving of the mainframe, which may be largely different when the actual move occurs based on the simulated latency injections.

However, by injecting latency into a mainframe application via a customized API, a more accurate testing may be performed in a production environment under close control, to more accurately determine effects or impacts to interconnected applications and services, including those of that may be external to an organization (e.g., external vendors, customers, and the like), to ensure that the mainframe operates similarly with minimal disruptions, or within expectations, when the actual moving of the mainframe occurs. For example, various adjustments, issue resolutions, fixes or the like may be performed prior to the move, so that the stakeholders can be assured that the moving of the mainframe will not disrupt normal operations only after the physical moving of the mainframes has occurred.

In operation 401, an open system adapter (OSA) routing to a simulated latency injector (SLI) system is performed. In an example, an application may have limited pathways in and out of the mainframe. One of the pathways, or an OSA route, may be directed to be passed through the SLI system for injecting predetermined amounts of latency. Other OSA route to the mainframe may not be directed to be passed through the SLI system or directed to bypass the SLI system, such that no simulated latency is added. According to exemplary aspects, the OSA routing through the SLI system may be performed in a production environment. In addition, such OSA routing may be performed dynamically, during operation to provide a seamless transition.

In operation 402, an initial latency is set for the SLI system. In an example, the initial latency may be set to 0ms. However, aspects of the present disclosure are not limited thereto, such that other latency amounts may be initially set.

In operation 403, once the OSA routing is set to the SLI system, and initial latency is set, then a mainframe application of a target mainframe to be moved is monitored for its stability. According to exemplary aspects, the mainframe application may be monitored for a predetermined period of time to ensure that the network connection through the OSA routing set in operation 401 is stable. If the network connection or the mainframe application is determined to be unstable, then the method proceeds to operation 404. On the other hand, if the mainframe application or the OSA route is determined to be stable, a planned latency injection schedule is initiated in operation 405.

In operation 404, the OSA routing is modified to a non-SLI system (i.e., normal OSA route that does not pass through the SLI system). In other words, OSA routing is modified to bypass the SLI system. Such modification in OSA routing may be performed dynamically. In an example, the OSA routing may be modified to the non-SLI system within a predetermined period of time once instability in the mainframe application or the SLI system OSA route is detected to reduce/minimize or to avoid impact to downstream applications/services and/or external applications/services. Once the OSA routing is modified to the non-SLI system, normal operations is resumed so that the downstream applications/services and/or external applications/services remain unaffected.

In operation 405, the planned latency injection schedule is initiated. In an example, predetermined amounts of latency may be injected at predetermined intervals while checking for stability therebetween. More specifically, a first latency amount (e.g., 35 ms) may be injected once the planned latency injection schedule is initiated. In an example, the first latency amount may be maintained for a predetermined period of time, a predetermined volume of data, a predetermined number of transactions or the like. If the mainframe application remains stable, as well as dependent downstream applications/services or external applications/services, then a second latency amount (e.g., 45 ms) is injected and monitored. The second latency amount may be maintained for a predetermined period of time, a predetermined volume of data, a predetermined number of transactions or the like. If the mainframe application remains stable, as well as dependent downstream applications/services or external applications/services, then a third latency amount (e.g., 55 ms) is injected and monitored. This process may be repeated for a number of times until a target latency amount (e.g., 65 ms) is reached.

In operation 406, latency 1 amount is injected to the SLI system OSA route. In an example, latency 1 amount may be higher than the initial latency (e.g., Oms) set in operation 402. Once the latency 1 amount is injected, stability of the mainframe application is monitored in operation 407. For example, the mainframe application may be monitored for its stability for a predetermined period of time, a predetermined volume of data, a predetermined number of transactions or the like. However, aspects of the present disclosure are not limited thereto, such that stability of one or more of dependent downstream applications/services or external applications/services may also be monitored. For example, application or service deemed to be important to an organization may be monitored along with the mainframe application to ensure proper performance in the production environment.

If the mainframe application is determined to be stable in operation 407, then the method proceeds to operation 408. In operation 408, a determination of whether the planned latency injection schedule is completed or not is made. In other words, a determination of whether the target latency amount has been reached or not is made in operation 408. If the planned latency injection schedule has not been completed, latency 2 amount is injected in operation 409.

On the other hand, if the mainframe application is determined not to be stable in operation 407, then the SLI system reverts back to the initial latency setting in operation 414. In an example, the initial latency may be set to Oms or a latency amount that is understood to be stable. However, aspects of the present disclosure are not limited thereto, such that, the SLI system may revert back to the last latency injection amount known to be stable.

Once the SLI system reverts back to the initial latency setting in operation 414, stability of the mainframe application is monitored for a predetermined period of time in operation 415. However, aspects of the present disclosure are not limited thereto, such that stability of one or more of dependent downstream applications/services or external applications/services may also be monitored for stability. If the mainframe application is determined not to be stabled at the initial latency setting, the OSA routing is modified to be directed away from the SLI system (i.e., non-SLI system OSA route) in operation 416. After modifying the OSA routing in operation 416, the SLI system is remediated for issues causing the instability in operation 417. At least since traffic is diverted prior to the remediation, production traffic may not impacted during the remediation. Once issues are remediated in operation 417, OSA routing is modified again to be directed through the SLI system in operation 418.

In operation 419, latency injections are resumed. According to exemplary aspects, latency injections may resume from where it previously failed. For example, if instability was detected after latency 3 amount is injected, latency injections may resume with latency 3 amount. However, aspects of the present disclosure are not limited thereto, such that latency injections may start from the beginning with latency 1 amount.

In operation 409, latency 2 amount is injected. In an example, latency 2 amount may be higher than the latency 1 amount. Once the latency 2 amount is injected, stability of the mainframe application is monitored in operation 407. For example, the mainframe application may be monitored for its stability for a predetermined period of time, a predetermined volume of data, a predetermined number of transactions or the like. However, aspects of the present disclosure are not limited thereto, such that stability of one or more of dependent downstream applications/services or external applications/services may also be monitored. For example, an application or service deemed to be important to an organization may be monitored along with the mainframe application to ensure proper performance in the production environment.

If the mainframe application is determined to be stable in operation 407, then the method proceeds to operation 408. In operation 408, a determination of whether the planned latency injection schedule is completed or not is made. In other words, a determination of whether the target latency amount has been reached or not is made in operation 408. If the planned latency injection schedule has not been completed, latency 3 amount is injected in operation 410.

On the other hand, if the mainframe application is determined not to be stable in operation 407, operations 414-419 are repeated.

In operation 410, latency 3 amount is injected. In an example, latency 3 amount may be higher than the latency 2 amount. Once the latency 3 amount is injected, stability of the mainframe application is monitored in operation 407. For example, the mainframe application may be monitored for its stability for a predetermined period of time, a predetermined volume of data, a predetermined number of transactions or the like. However, aspects of the present disclosure are not limited thereto, such that stability of one or more of dependent downstream applications/services or external applications/services may also be monitored. For example, an application or service deemed to be important to an organization may be monitored along with the mainframe application to ensure proper performance in the production environment.

If the mainframe application is determined to be stable in operation 407, then the method proceeds to operation 408. In operation 408, a determination of whether the planned latency injection schedule is completed or not is made. In other words, a determination of whether the target latency amount has been reached or not is made in operation 408. If the planned latency injection schedule has not been completed, latency n amount is injected in operation 411.

On the other hand, if the mainframe application is determined not to be stable in operation 407, operations 414-419 are repeated.

In operation 411, latency n amount is injected. In an example, latency n amount may be higher than the previously injected latency amounts. Moreover, latency n amount may be the target latency amount, which may be similar to the expected latency expected at the location/region to which the mainframe is to be moved. Although four latency injections are illustrated as being performed in the planned latency injection schedule, aspects of the present disclosure are not limited thereto, such that there may be more or less injections in the planned latency injection schedule.

Once the latency n amount is injected, stability of the mainframe application is monitored in operation 407. For example, the mainframe application may be monitored for its stability for a predetermined period of time, a predetermined volume of data, a predetermined number of transactions or the like. However, aspects of the present disclosure are not limited thereto, such that stability of one or more of dependent downstream applications/services or external applications/services may also be monitored. For example, an application or service deemed to be important to an organization may be monitored along with the mainframe application to ensure proper performance in the production environment.

If the mainframe application is determined to be stable in operation 407, then the method proceeds to operation 408. In operation 408, a determination of whether the planned latency injection schedule is completed or not is made. In other words, a determination of whether the target latency amount has been reached or not is made in operation 408. In an example, if latency n amount corresponds to the target latency amount, then the method proceeds to operation 412.

In operation 412, an indication of completion of certification is provided. Once certification is received in operation 412, the mainframe is deemed to be ready for moving to the new location/region.

Once certification is completed in operation 412, the OSA routing is directed to an OSA route though a non-SLI system in operation 413. In other words, the OSA routing may be modified to bypass the SLI system in operation 413. Once the OSA routing is modified or reverted to through the non-SLI system, normal operation is resumed.

As exemplarily described above, by controlling latency injection pace, times, frequency and/or amounts into the mainframe in a production environment, latency simulation may be performed more accurately in a production environment without causing noticeable disruptions or impact to other services or applications. With constant checks and monitoring for stability and with ability to dynamically remove latencies and/or change OSA routes upon detection of instability, a more accurate testing may be performed in the product environment for the simulated latencies and their effects to the interconnected or interdependent services, applications, systems or the like. Accordingly, a more complete or accurate capturing of issues to address and expected performance may be provided for a smoother transition before the actual physical moving of the mainframe is conducted.

Moreover, although predefined numbers and/or amounts of latency injections and predetermined duration of stability checks are described above, aspects of the disclosure are not limited thereto, such that a number of latency injections, amount of latency injected, duration of latency injections, schedule for the latency injections, and duration of stability checks may be set or adjusted by one or more machine learning (ML) or artificial intelligence (AI) algorithms.

In an example, AI or ML algorithms may be executed to perform data pattern detection, and to provide an output or render a decision based on the data pattern detection. More specifically, an output may be provided based on a historical pattern of data, such that with more data or more recent data, more accurate outputs and/or decisions may be provided or rendered. Accordingly, the ML or AI models may be constantly updated after a predetermined number of runs or iterations. According to exemplary aspects, machine learning may refer to computer algorithms that may improve automatically through use of data. Machine learning algorithm may build an initial model based on sample or training data, which may be iteratively improved upon as additional data are acquired.

More specifically, machine learning/artificial intelligence and pattern recognition may include supervised learning algorithms such as, for example, k-medoids analysis, regression analysis, decision tree analysis, random forest analysis, k-nearest neighbors analysis, logistic regression analysis, 5-fold cross-validation analysis, balanced class weight analysis, and the like. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, and the like.

In another exemplary embodiment, the ML or AI model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the ML or AI model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the ML or AI models may be generated using at least one from among an artificial neural network technique, a decision tree technique, a support vector machines technique, a Bayesian network technique, and a genetic algorithms technique.

Figure 5:
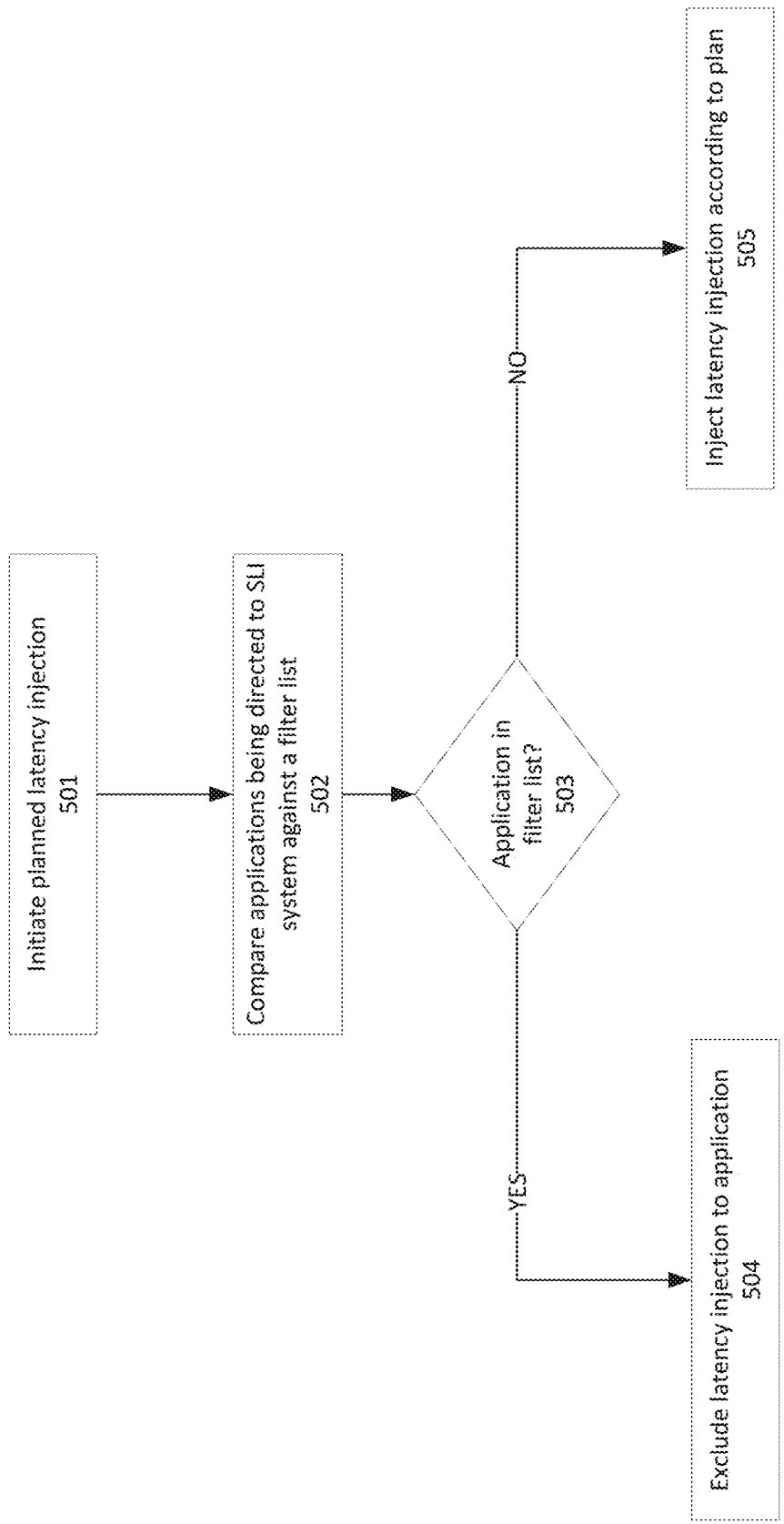
FIG. 5 illustrates a method for selectively filtering applications to inject simulated latency in accordance with an exemplary embodiment.

FIG. 5 illustrates a method for selectively filtering applications to inject simulated latency in accordance with an exemplary embodiment.

In operation 501, a planned latency injection schedule is initiated. In an example, the latency injection schedule may be initiated or executed using an API. According to exemplary aspects, the planned latency injection schedule may be predefined, in which certain amount of latency is injected to a network path of a mainframe for a certain duration before a differing amount of latency is injected in a step-wise manner. This process may be repeated until a target latency is reached. However, aspects of the present disclosure are not limited thereto, such that amount of latencies to be injected, stages of injections, and duration between injections may be determined by one or more ML or AI algorithms. In an example, the target latency may correspond to latency expected at a destination or a target region/location to which the mainframe is to be moved.

In operation 502, each of applications or sources directing traffic to the SLI system may be identified and compared against a filter list. For example, the filter list may specify for which applications the planned latencies are to be injected, and for which applications the planned latencies are not to be injected. According to exemplary aspects, for devices that are configured to be located near or within a proximate distances from the mainframe, no simulated latencies may be injected as such devices may move with the mainframe to the destination or target region/location. In an example, the applications or sources directing traffic to the SLI system may be identified based on their IP addresses.

In operation 503, a determination of whether the application being directed to the SLI system for applying simulated latency is included in the filter list or not. In an example, applications with collocation affinity to the mainframe may be included in the filter list. If the application is determined to be included in the filter list, the application is excluded from the latency injection in operation 504. Accordingly, latency injections may be excluded even if the application passes through the SLI system OSA route. However, aspects of the present disclosure are not limited thereto, such that a differing latency injection amount may be provided based on a respective device's eventual distance from the mainframe to be moved.

On the other hand, if the application is determined not to be included in the filter list, latency is injected according to the latency injection schedule in operation 505.

Figure 6:
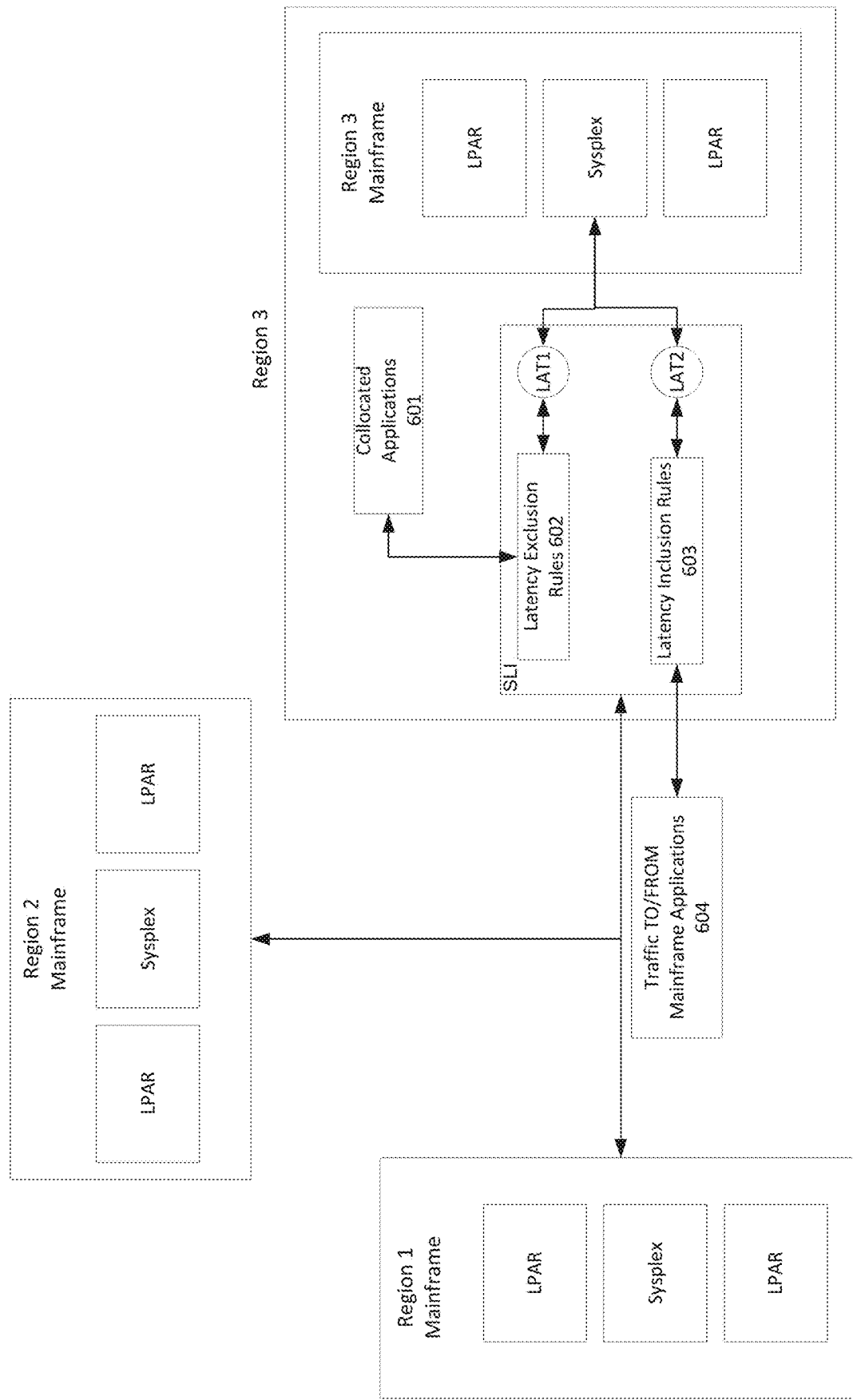
FIG. 6 illustrates a system diagram illustrating a filtering performed by a simulated latency injection system in accordance with an exemplary embodiment.

FIG. 6 illustrates a system diagram illustrating a filtering performed by a simulated latency injection system in accordance with an exemplary embodiment.

As illustrated in FIG. 6, multiple mainframes in different locations may communicate with one another. Region 1 mainframe may communicate with Region 2 and Region 3 mainframes. According to exemplary aspects, the Region 3 mainframe may be a mainframe that may be moved to a target destination upon certification. In this regard, the Region 3 mainframe may be connected with a simulated latency injector system/device/appliance for injecting simulated latencies.

Each of the mainframes may have a number of OSA routes for directing network traffic. One or more of the OSA routes may be directed through the SLI system. OSA routes may be dynamically modified to pass through the SLI system or bypass the SLI system based on application/system/network stability. The network traffic from the other mainframes, as well as other systems, may be checked against latency exclusion rules 602 and/or latency inclusion rules 603. According to exemplary aspects, network traffic from mainframe applications 604 may be included in the latency inclusion rules 603 to specify that the simulated latency injection schedule LAT2 is to be applied to the received network traffic. In an example, source of the network traffic may be identified using IP addresses. Further, the latency inclusion rules 603 may include one or more rules that specify which applications, sources or the like are to be injected with simulated latencies specified in the simulated latency injection schedule LAT2. Moreover, the amount of simulated latency injected may be dynamically modified during operation.

If the network traffic is directed from collated applications 601, or from devices that are to be moved with the Region 3 mainframe, such network traffic may be included in the latency exclusion rules 602. In an example, the latency exclusion rules 602 may include one or more rules that specify which applications, sources or the like are to be omitted from being injected with simulated latencies included in the simulated latency injection schedule LAT 2. Instead, such network traffic may be applied with a different latency amount LAT 1. In an example, latency amount LAT 1 may be 0ms. However, aspects of the present disclosure are not limited thereto, such that LAT 1 may indicate a latency amount different from latencies included in the simulated latency injection schedule LAT 2, and may correspond to a distance from the target region/location to which the Region 3 mainframe is to be moved. Once the correct latency amounts are applied, the network traffic is provided to the Region 3 mainframe for processing. During the latency injection operations, system/application/network stability may be monitored for stability to ensure downstream or external services/applications are not negatively impacted.

Further, although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing varying amounts of simulated latencies for a mainframe, the method comprising:
    performing, using a processor and a memory:
        modifying an open system adapter (OSA) routing to pass through a simulated latency injector system to inject a simulated latency for a target mainframe;
        setting an initial latency amount for the target mainframe;
        performing first monitoring for stability of a mainframe application;
        when the mainframe application is determined to be unstable in the first monitoring, modifying the OSA routing to bypass the simulated latency injector system;
        when the mainframe application is determined to be stable in the first monitoring, initiating a planned latency injection schedule for injecting a plurality of latencies in differing amounts until a target latency amount is reached;
        performing second monitoring for the stability of the mainframe application for a predetermined period of time after injection of at least one latency among the plurality of latencies;
        modifying an injected latency amount back to the initial latency amount when the mainframe application is determined to be unstable in the second monitoring; and
        applying another latency amount specified in the planned latency injection schedule when the mainframe application is determined to be stable in the second monitoring.

2. The method according to claim 1, wherein the plurality of latencies in differing amounts is injected for the target mainframe in an increasing manner until the target latency is reached, and
    wherein the second monitoring is performed after each injection.

3. The method according to claim 1, wherein the planned latency injection schedule for the target mainframe is determined to be complete when the at least one latency injected has the target latency amount and the mainframe application is determined to be stable for the predetermined period of time in the second monitoring.

4. The method according to claim 1, wherein the plurality of latencies in differing amounts included in the planned latency injection schedule is injected in a production environment.

5. The method according to claim 1, further comprising:
    performing a third monitoring for the stability of the mainframe application for a predetermined period of time after the modifying of the injected latency amount back to the initial latency amount; and
    when the mainframe application is determined to be unstable in the third monitoring, modifying the OSA routing to bypass the simulated latency injector system.

6. The method according to claim 1, further comprising:
    performing a third monitoring for the stability of the mainframe application for a predetermined period of time after the modifying of the injected latency amount back to the initial latency amount;
    when the mainframe application is determined to be stable in the third monitoring, remediating an issue causing the mainframe application instability; and
    resuming latency injection according to the planned latency injection schedule.

7. The method according to claim 6, wherein the latency injection is resumed by injecting a latency injection amount that caused the instability of the mainframe application detected in the third monitoring, and continuing with remainder of the planned latency injection schedule.

8. The method according to claim 6, wherein the latency injection is resumed by restarting latency injections from beginning of the planned latency injection schedule.

9. The method according to claim 1, wherein the modifying of the OSA routing is performed dynamically in a production environment.

10. The method according to claim 1, wherein each of the injecting of the plurality of latencies is separated by a predetermined period of time.

11. The method according to claim 1, wherein the planned latency injection schedule injects the plurality of latencies in differing amounts in a sequential order until the target latency amount is reached, and
wherein the second monitoring is performed after each injection.

12. The method according to claim 1, wherein the injecting of the plurality of latencies in differing amounts is performed dynamically.

13. The method according to claim 1, further comprising:
determining a source of network traffic being directed through the simulated latency injector system;
comparing the determined source with a filter list for determining whether to inject or not inject the plurality of latencies in differing amounts; and
excluding injection of the plurality of latencies in differing amounts for the network traffic from the determined source when the determined source is included in the filter list.

14. The method according to claim 13, wherein the determined source of the network traffic is determined based on an IP address of the network traffic.

15. The method according to claim 13, wherein an application having a collocation affinity to the target mainframe is included in the filter list.

16. The method according to claim 1, wherein the OSA routing and latency injection amounts are dynamically controlled for reducing impact to at least one of a downstream service or application, and an external service or application in a production environment.

17. The method according to claim 1, wherein the plurality of latencies in differing amounts is injected to the mainframe application via an API.

18. The method according to claim 1, wherein the initial latency amount is 0 ms.

19. A system for providing varying amounts of simulated latencies for a mainframe, the system comprising:
at least one processor;
at least one memory; and
at least one communication circuit,
wherein the at least one processor performs:
modifying an open system adapter (OSA) routing to pass through a simulated latency injector system to inject a simulated latency for a target mainframe;
setting an initial latency amount for the target mainframe;
performing first monitoring for stability of a mainframe application;
when the mainframe application is determined to be unstable in the first monitoring, modifying the OSA routing to bypass the simulated latency injector system;
when the mainframe application is determined to be stable in the first monitoring, initiating a planned latency injection schedule for injecting a plurality of latencies in differing amounts until a target latency amount is reached;
performing second monitoring for the stability of the mainframe application for a predetermined period of time after injection of at least one latency among the plurality of latencies;
modifying an injected latency amount back to the initial latency amount when the mainframe application is determined to be unstable in the second monitoring; and
applying another latency amount specified in the planned latency injection schedule when the mainframe application is determined to be stable in the second monitoring.

20. A non-transitory computer readable storage medium that stores a computer program for providing varying amounts of simulated latencies for a mainframe, the computer program, when executed by a processor, causing a system to perform a process comprising:
modifying an open system adapter (OSA) routing to pass through a simulated latency injector system to inject a simulated latency for a target mainframe;
setting an initial latency amount for the target mainframe;
performing first monitoring for stability of a mainframe application;
when the mainframe application is determined to be unstable in the first monitoring, modifying the OSA routing to bypass the simulated latency injector system;
when the mainframe application is determined to be stable in the first monitoring, initiating a planned latency injection schedule for injecting a plurality of latencies in differing amounts until a target latency amount is reached;
performing second monitoring for the stability of the mainframe application for a predetermined period of time after injection of at least one latency among the plurality of latencies;
modifying an injected latency amount back to the initial latency amount when the mainframe application is determined to be unstable in the second monitoring; and
applying another latency amount specified in the planned latency injection schedule when the mainframe application is determined to be stable in the second monitoring.

\* \* \* \* \*